United States Patent [19]
Demidov et al.

[11] Patent Number: 5,531,400
[45] Date of Patent: Jul. 2, 1996

[54] AIRBORNE VEHICLE

[76] Inventors: German V. Demidov, ul. Frunze, d.9, kv.173, Kazan, Russian Federation, 420033; Eduard S. Osipov, ul. M.Gorkogo, d.6 kv.22, Kazan, Russian Federation, 420015

[21] Appl. No.: 307,612
[22] PCT Filed: Jan. 20, 1994
[86] PCT No.: PCT/RU94/00007
  § 371 Date: Sep. 20, 1994
  § 102(e) Date: Sep. 20, 1994
[87] PCT Pub. No.: WO94/16943
  PCT Pub. Date: Aug. 4, 1994

[30] Foreign Application Priority Data

Jan. 20, 1993 [RU] Russian Federation ............. 93003439

[51] Int. Cl.$^6$ .......................... B64C 36/00; B64C 37/02
[52] U.S. Cl. ................... 244/2; 244/15; 244/63; 244/55
[58] Field of Search ............... 244/2, 3, 55, 56, 244/63, 172, 15

[56] References Cited

U.S. PATENT DOCUMENTS

| | | | |
|---|---|---|---|
| 2,901,499 | 4/1961 | Janney II | 244/2 |
| 3,093,348 | 6/1963 | Schelp et al. | 244/63 |
| 3,103,324 | 9/1963 | Price | 244/15 |
| 4,265,416 | 5/1981 | Jackson et al. | 244/63 |

FOREIGN PATENT DOCUMENTS

| | | | |
|---|---|---|---|
| 1586576 | 2/1970 | France . | |
| 580696 | 6/1992 | U.S.S.R. | 244/2 |

OTHER PUBLICATIONS

Sanger, Sanger News, No. 1, Mar. 1990.
"Technical Information", Bureau of Technical Information under the Central–Hydrodynamic Institute, No. 15, 1967, pp. 11–29.

"Hypersonic transport aircraft" by Ya. N. Gaukman, Transport PH, 1967, pp. 17–22.

"Blackjack: Soviet B–1 or better?", B. Sweetmann and G. Warwick, Flight International, No. 12, 1982, pp. 1700–1704.

"Sverkhzvukovye samolety", Tsikhosh E., 1983, Mir (Moscow), pp. 138–140, pp. 399–402.

"Bezaerodromnaya aviatsiya", Ruzhitsky E. I., 1959, Gosudarstvennoe izdatelstvo oboronnoi promyshlennosti, (Moscow, pp. 53–54.

"Samolety osobykh skhem", Sobolev D. A., 1989, Mashinostroenie, (Moscow), pp. 153–154.

"Vkhodnye ustroistva sverkhzvukovykh samoletov", Nechaev Ju. N., 1963, Voennoe izdatelstvo Ministerstva oborony SSSR, (Moscow), pp. 7–11.

*Primary Examiner*—Galen L. Barefoot
*Attorney, Agent, or Firm*—Merchant, Gould, Smith, Edell, Welter & Schmidt

[57] ABSTRACT

The present invention relates to construction of aircraft engines and has particular reference to the development of novel airborne vehicles. The invention is aimed at providing novel airborne vehicles capable of long-range nonstop flights with a specified amount of cargo, as well as at solving a complex of problems involved in extending the functional capabilities of the existing airborne vehicles. The airborne vehicle comprises a fuselage 1 carrying a suspension unit 6 held thereto and consisting of additional fuel reservoirs 7, an additional power plant 8, a landing gear 4, and an additional landing gear 18 of the suspension unit 6 which can be held to the fuselage 1 either through a hinge joint 5 or with the aid of panels.

11 Claims, 6 Drawing Sheets

AIRBORNE VEHICLE

TECHNICAL FIELD

The invention relates to aviation engineering and, more particularly, the technological purpose is aimed at carrying large-size cargoes, as well as erection, agriculture fire-fighting, and some other operations.

BACKGROUND ART

Known in the art is an airborne vehicle for long-distance non-stop flights at supersonic flight speeds, said vehicle comprising, a fuselage, a wing with a hinge joint for tilting the wing outboard panel in a horizontal plane, a gas-turbine power plant mounted on the tailplane, a landing gear, and flight controls.

The heretofore-known airborne vehicle Boeing 2707 has been developed by the Boeing Co. (cf. the journal "Technical information", Bureau of Technical Information under the Central-Hydrodynamic Institute, No. 15, 1967, pp. 11–29 (in Russian).

However, the known technical solution fails to reduce the operational expenses of such an airborne vehicle with a gas-turbine power plant operating on a hydrocarbon fuel for double-increased or more distances of the so-called "flight-range parameter" MIK, where M stands for the Mach number, I means the specific impulse of the power plant, and K indicates the L/D ratio, said parameter being used for assessing the efficiency of an airborne vehicle, while the value of said parameter is inversely proportional to the airborne vehicle operational costs (c.f. "Hypersonic transport aircraft" by Ya.N.Gaukman, Transport PH, 1967, pp. 17–22 (in Russian)

One more airborne vehicle for long-distance port-stop flights at supersonic speeds is known to comprise a fuselage, a wing with a hinge joint for tilting the outboard wing panel in a horizontal plane, an underwing hydrocarbon-fuel fired power plant, a landing gear, and flight controls (cf. B. Sweetmann and G. Warwick "Blackjack: Soviet B-1 or better?", journal Flight International, No. 12, 1982, pp. 1700–1704).

The aforementioned known technical solution, however, also fails to reduce the vehicle operational costs for increased range of non-stop flight and specified payload due to a low value of the "flight range parameter" MIK applied in the Ya.N.Gaukman's technique for assessing the efficiency of an airborne vehicle.

DISCLOSURE OF THE INVENTION

The present invention has for its object to provide a longer flying range with a specified payload at reduced operational costs for an airborne vehicle.

As far as the vehicle construction is concerned, the foregoing object is accomplished due to the fact that the airborne vehicle comprises a fuselage, an underwing hydrocarbon-fuel fired power plant, a landing gear, and flight control. The vehicle is also provided with an external suspension unit consisting of shells of additional fuel reservoirs for, e.g., hydrogen. An additional power plant and cowlings form an airfoil capable of creating aerodynamic lift. The suspension unit is held to the fuselage and having a front opening and a rear opening, both has shaped side faces whose axes of symmetry are arranged in a vertical plane that passes through the fuselage center line, a ramjet engine as an additional power plant being interposed between said openings.

The vehicle power plant uses, e.g., hydrogen as a fuel, and features a variable ratio of compression of the air stream in the flow-through section thereof from a minimum value at subsonic flight speeds when the ramjet engine inlet device defined by the side shaped faces of the front opening of the suspension unit and the ramjet engine passage inlet section proper, is located in the "aerodynamic (wing) shadow" of the fuselage, up to a maximum value at high supersonic flight speeds. The degree of compression is varied by changing the position of the ram jet engine inlet device either through displacing the suspension unit downwards with respect to the fuselage center line or by displacing the fuselage center line, using the flight controls, relative to the velocity vector for the magnitude of the trimming angle of attack.

The ramjet engine exit device is established by the side faces of the rear opening of the suspension unit and the rear shaped flaps situated past the pivot axis and deflectable from the ramjet longitudinal axis at a high super-sonic flight speed, and is further established by the panels for closing the clear area of the rear opening at a subsonic flight speed.

The suspension unit is additionally provided with a landing gear and motions controls which consist of air foils and jet control devices.

The additional power plant of the present airborne vehicle is provided with an air stream preheating system in the boost phase of the vehicle flight until the cruising speed is attained, said preheating system appearing as a combination turbojet-ramjet engine with afterburning of the products of incomplete fuel combustion from a high-temperature gas generator, the cases of said engine being located on both sides of the ramjet engine in a horizontal plane.

The ramjet section of the combination engines comprises an entrance device in the form of shaped front flaps situated before the pivot axis of the rear shaped flaps of the exit device of the jet section of the combination engines.

The external surfaces of the suspension unit of the present vehicle are curvilinear in a transverse plane, and the additional power plant is provided with engine-propeller units for take-off, said units being arranged symmetrically with respect to the ramjet engine longitudinal axis.

The suspension unit is hinge-joined to the fuselage and has longitudinal stands so as to enable the front edge of the suspension unit to be located past the fuselage and the fuselage disengagement unit in case of emergency.

Additional fuel reservoirs of the vehicle are toroidal in shape, deformable and have different cross-sectional dimensions, said toroidal reservoirs being consecutively inserted one into another so that the solid of revolution having a smaller outside diameter can be put into the respective inside diameter of a greater-radius solid of revolution to form a closed curve.

The suspension unit is secured on the fuselage with the aid of its additional power plant.

The suspension unit is so held to the fuselage as to establish between the surface thereof and that of the suspension unit, a convergent-divergent duct of the ejector unit of the vehicle additional thrust, the interior space of said ejector unit communicating with the exit of the engines of the additional power plant.

The suspension unit has landing gear struts, the axes of rotation of the landing gear wheels being situated outside the axis of rotation of the main landing gear wheels, and the struts being adjustable for length.

The suspension unit has soft-landing engines as part of the vehicle recovery system.

The suspension unit is separable into component parts in a vertical plane, said components being held together by bundles from a strong composition material based on unidirectional high-strength fibers. A cargo compartment for accomodating the stabilization member of the vehicle recovery system such as, e.g., a parachute, is provided in the central portion of the suspension unit.

The suspension unit is arranged at an angle to the fuselage fore-and-aft axis.

BRIEF DESCRIPTION OF THE DRAWINGS

To promote understanding of the present invention, there is given below a specific embodiment with reference to the accompanying drawings, wherein.

BEST METHOD OF CARRYING OUT THE INVENTION

Figure 1:
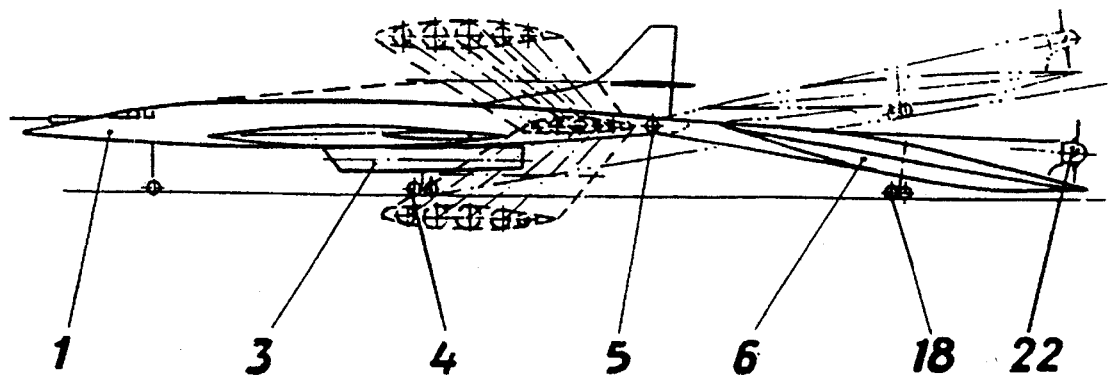
FIG. 1 is a schematic view of the airborne vehicle with the wing thereof set to a position of a minimum sweep.

The airborne vehicle of the present invention comprises a fuselage 1, a variable-sweep wing 2 with a single joint for tilting its outboard panel in a horizontal plane, a gas-turbine power plant 3 mounted under the wing 2 and operating on a hydro-carbon fuel, a landing gear 4, and flight controls which are interconnected in an appropriate way (FIG. 1).

Figure 2:
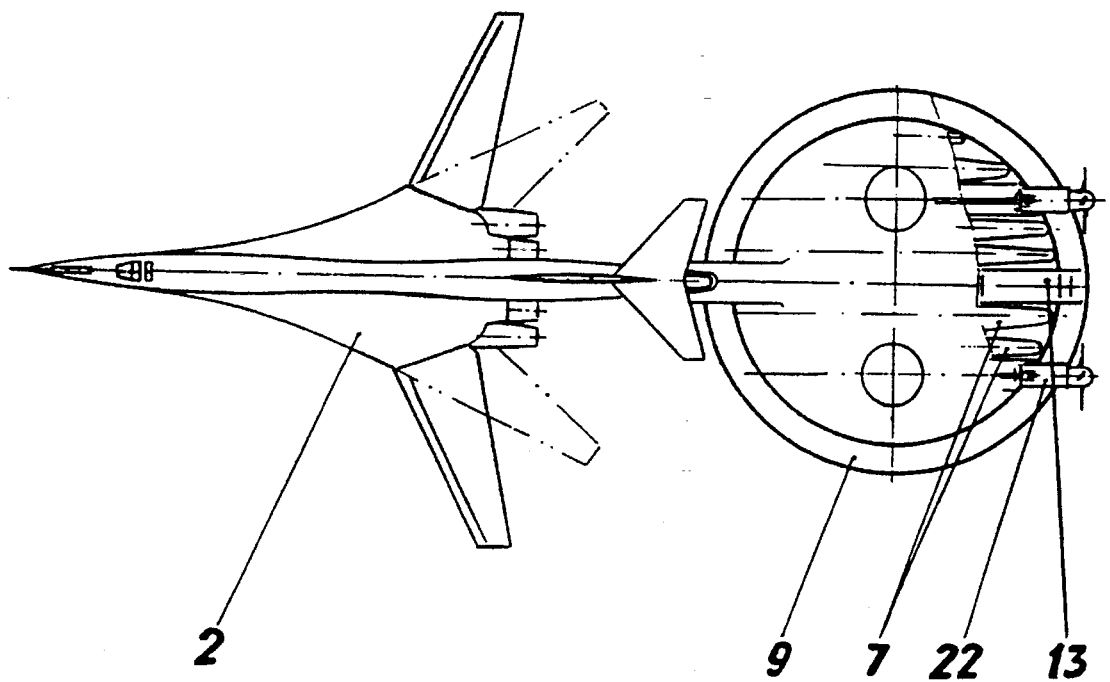
FIG. 2 is a plan view of FIG. 1 with partial cut-away to show the suspension unit.

The fuselage 1 mounts an additional hinge joint 5 on which a suspension unit 6 is fitted. The suspension unit 6 consist of a number of longitudinal shells of additional fuel reservoirs 7, an additional power plant 8, and construction members of cowlings 9 that establish an aerodynamic configuration of for the suspension unit 6 which develops an aerodynamic lift while in flight, which is equal to the loaded vehicle weight plus the weight of fuel on board the vehicle (FIG. 2).

The suspension unit 6 whose load-bearing framework is constituted by the interconnected shells of fuel reservoirs, has a front opening and a rear opening having axes of symmetry lying in a vertical plane passing through the fuselage center line. A ramjet engine 10 of the additional power plant 8 is interposed between the rear and front openings, said engine featuring a variable airstream compression ratio in the flow-through section thereof.

Figure 3:
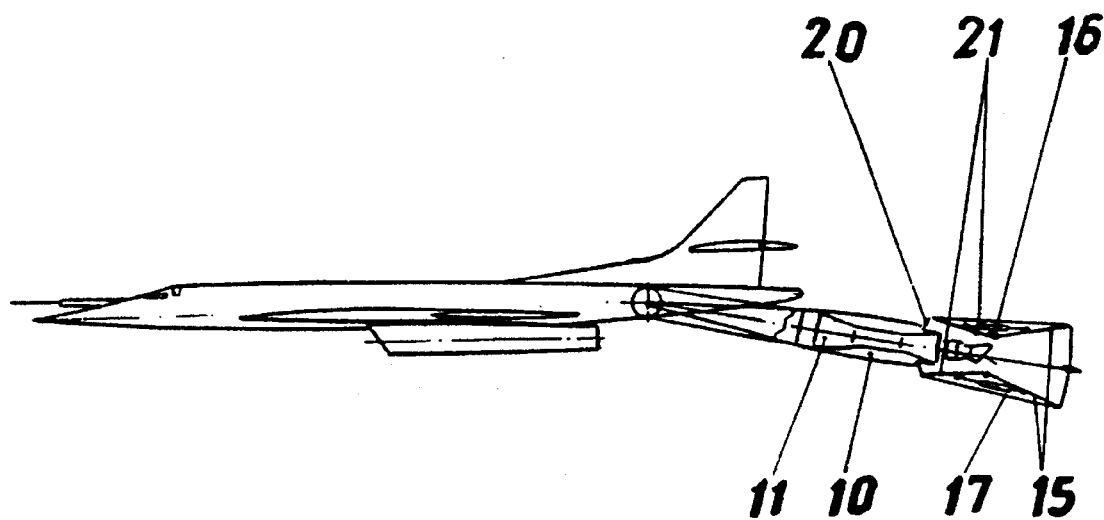
FIG. 3 is a schematic view of the airborne vehicle with the wing thereof in a position of a maximum sweep and with the suspension unit in a position wherein the additional power plant is operating.

An inlet device 11 is defined by side shaped faces 12 of the front opening which are open in the duct cross-section, and the front section of the flow-through duct of the engine 10 which is closed in its cross-section (FIG. 3).

A downward displacement of the suspension unit 6 relative to the center line of the fuselage 1 is accomplished by means of the controls which control motion of the unit 6, said controls consisting of airfoils capable of providing large angular displacements and of jet control devices communicating, through control members, with a higher-pressure space, said jet control devices being aimed at providing small angular displacements when adjusting the direction of flow of the incoming airstream, the latter being compressed by virtue of an extra area of the inlet diffuser in the form of the lower section of the surface of the fuselage 1 and the wing 2 with their position at the trimming angle of attack with respect to the velocity vector.

Figure 4:
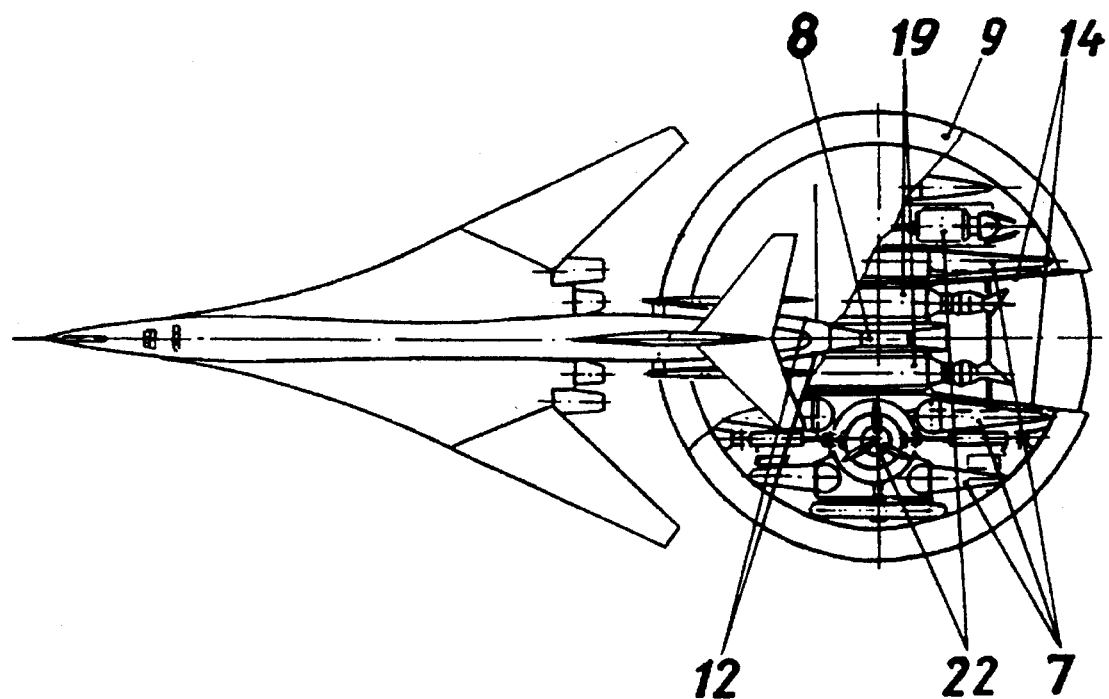
FIG. 4 is a plan view of FIG. 3 with fragmentary cut-away to show the suspension unit.

An exit device 13 of the ramjet engine 10 is defined by side faces 14 of the rear opening and by rear shaped flaps 15 situated past a pivot axis 16, such that panels 17 lose the clear area of the rear opening at subsonic flight speeds and are deflectable from the longitudinal axis of the ramjet engine 10 at high supersonic flight speeds (FIG. 4).

The suspension unit 6 is additionally provided with a landing gear 18.

The additional power plant is provided with an airstream preheating system in the boost phase of the flight until the vehicle cruising speed is attained, said system being in fact a combination turbojet-ramject engine 19 with afterburning of the products of incomplete fuel combustion from a high-temperature gas generator. The cases of the high-temperature gas generator of the combination engines 19 are arranged on both sides of the case of the ramjet engine 10 in a longitudinal horizontal plane.

The ramjet section of the combination engines has an additional inlet device 20 in the form of U-shaped front flaps 21 located ahead of the pivot axis 16 of the rear shaped flaps of the exit device of the ramjet section of the combination engines 19. The external surfaces of the suspension unit 6 may have a curvature radius in the transverse plane, and the additional power plant 8 may be additionally provided with an engine-propeller unit for take-off, the propeller of said unit being located past the suspension unit 6 so as to develop a push force at subsonic flight speeds and being retractable e.g., into the engine bay, at supersonic flight speeds.

Engines 22 of the engine-propeller units are arranged symmetrically with respect to the longitudinal axis of the ramjet engine 10 of the suspension unit 6 in such a manner that the propeller blades are located,during take-off and landing,above the lowest generatrix of the curvilinear surface of the suspension unit 6 and displaced to a side of the vertical longitudinal plane, wherein the landing gears 4 and 18 are situated.

The suspension unit 6 may be provided with additional longitudinal stands which are connected to the additional hinge joint 5 so as to enable the front edge of the suspension unit 6 to be situated past the fuselage 1. The additional hinge joint 5 carries a unit for disengaging the suspension unit 6 from the fuselage 1 in emergency cases.

The airborne vehicle of the present invention incorporates the base aircraft 1 comprising a fuselage, a wing, a landing gear, engines, e.g., turboprop engines, flight controls, and the suspension unit 6 secured on rigid suspension units of panels 23, 24, 25. The rigid suspension units appear as the longitudinal panels 23 held e.g., by a clamp joint made from a high-strength composition material having increased reliability due to multielement structure having high resistance to elementary breaks in the fuselage, and the panels 24, 25 made fast on the engine bays of the base aircraft 1.

The suspension unit 6 is made of a number of the fuel reservoirs 7 which are pliable and have a toroidal shape of different cross-section formed by a closed curve. An axis is coplanar with said curve but situated off its contour, each of the individual reservoirs being formed by rotation around said axis.

Figure 5:
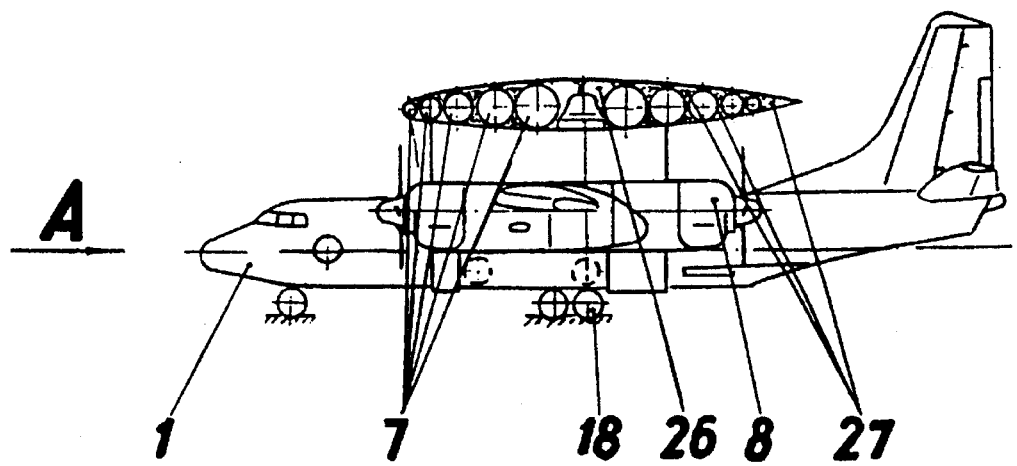
FIG. 5 s a schematic view of the airborne vehicle with toroidal additional fuel reservoirs.

FIG. 5 represents a sectional view of exemplary reservoirs 7 in the form of a closed curve, that is, a circumference, taken by a local longitudinal section through the suspension unit 6. Individual toroidal-shaped reservoirs 7 are inserted one into another with an outside diameter of a solid of revolution of a smaller radius into the respective inside diamater of a greater-radius solid of revolution. A compartment 26 is located at the center of the suspension unit for the stabilization system of the total emergency recovery system of the vehicle in the form, e.g., of a parachute. The construction elements of an airfoil filler 27 from a light-weight material are secured on the external surfaces of the reservoirs 7. The edging of the surfaces of the individual reservoirs 7 together with the construction elements of the airfoil filler 27 establishes an airfoil having an aerodynamic lifting surface.

Figure 6:
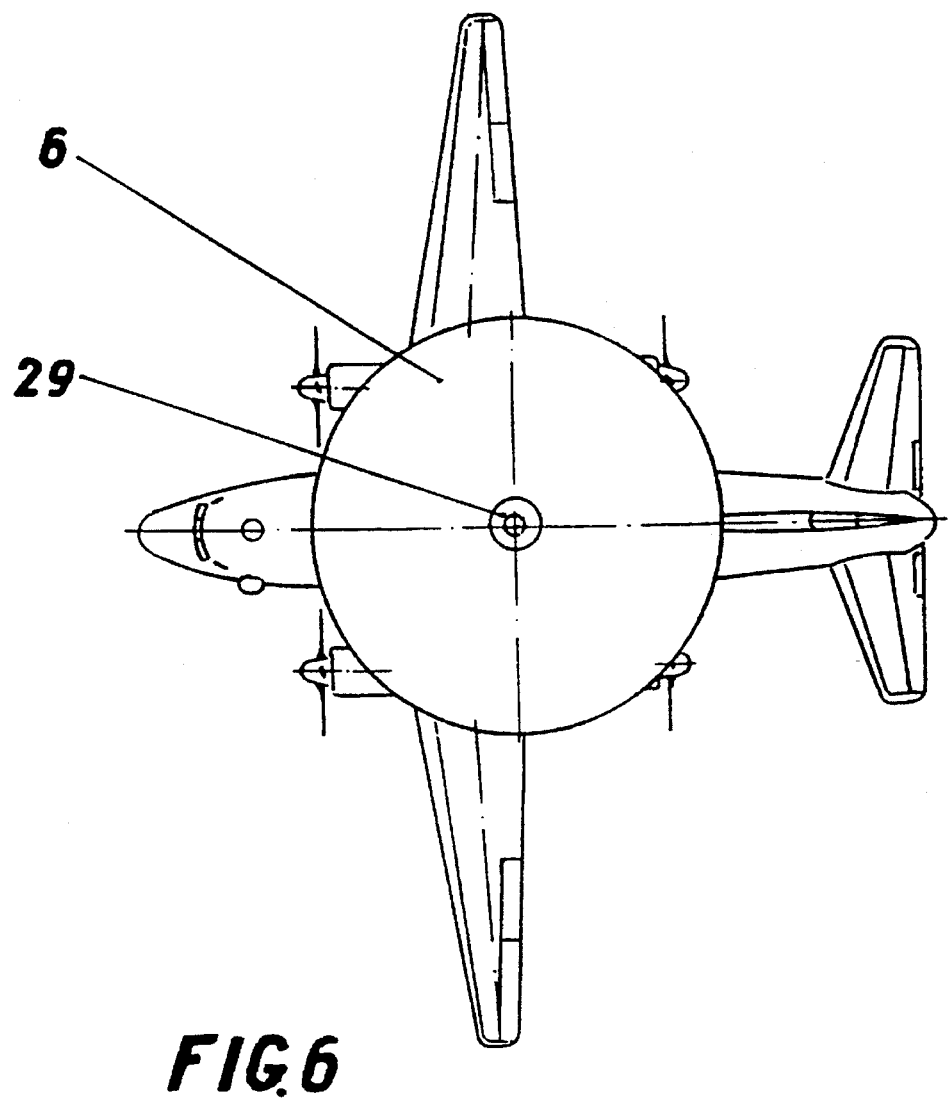
FIG. 6 is a plan view of FIG. 5.

The suspension unit 6 is provided with additional engines 8 which are situated on the main airborne vehicle (depending on the configuration of the base aircraft) so as not to increase the aerodynamic drag of the vehicle as a whole. FIG. 5 shows the additional engines 8 located behind the main engines, that is, at the place not occupied by the exit device of the main engine passing a flow of combustion products, thus performing the function of suspension through a flanged butt joint to the vehicle 1. In this case the panels 24 and 25 have an adjustable support on the engine bays of the base aircraft, and rigid supports located on the additional engines 8 and adapted to take up loads from the additional suspension unit 6 (FIG. 6).

Figure 7:
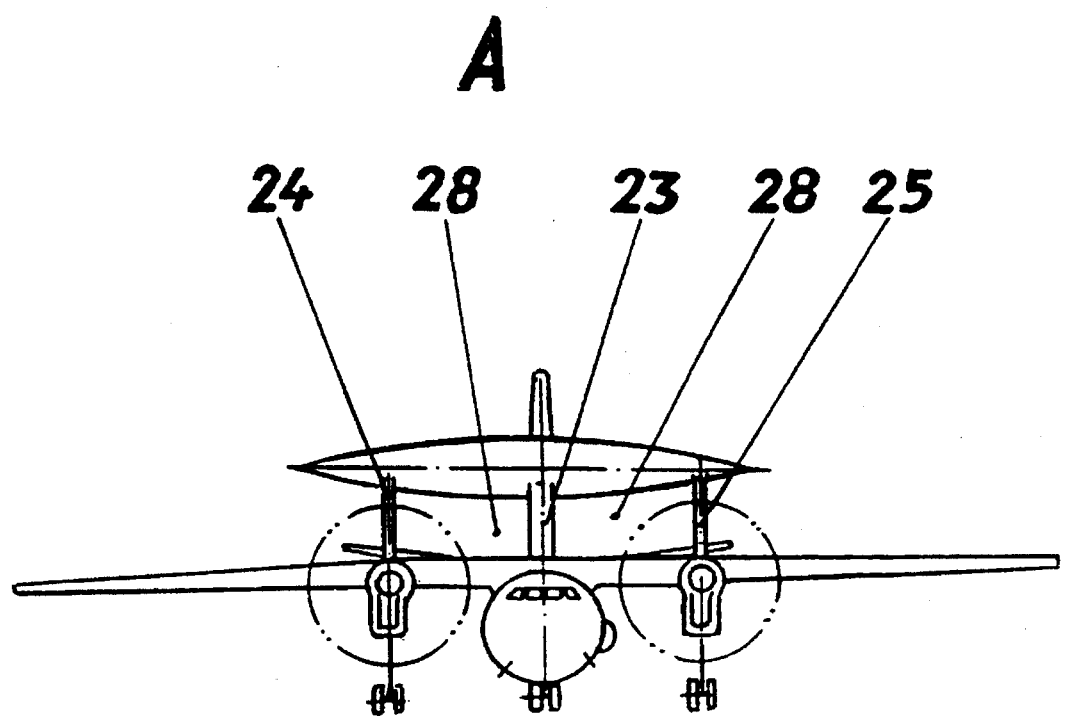
FIG. 7 is a front elevation of FIG. 6.

Some parts of the surfaces of the suspension unit 6 of the additional engines 8 and of the panels 24, 25 together with part of the vehicle surface establish a convergent-divergent air duct of an ejector unit 28 for vehicle additional thrust (FIG. 7). The interior space of said spatial duct communicates with the exit space of the flow of the combustion products of the engines.

Additional struts of the landing gear 18 are held to the suspension unit 6, said struts being so arranged as to enable the axes of rotation of the wheels to be off the axis of rotation of the main landing gear wheels. The additional struts of the landing gear 18 are adjustable for height in order to provide a functionally required change in the vehicle angle of attack during take-off and landing by keeping a constant pressure in the hydraulic cylinder head and by-passing part of the fluid through the control valve in response to a change in the load applied to the piston rod during take-off or landing, said control valve having its time constant greater than that of the shock-absorber and operating both sides.

To render the manufacture and assembly of the suspension unit 6 easier, the latter is separable in vertical planes passing through the axis of rotation around which rotates a closed curve that establishes a cross-sectional contour of each particular reservoir 7. The separable joints of the suspension unit 6 divide it into a number of parts, each of them consisting of parts of toruses held along side the construction elements of the airfoil filler with a tight-weight material, through bundles of a composition material based on unidirectional high-strength fibers, thus forming, when assembled, an airfoil panel. A load compartment, that is, cargo hatche 29 is formed in the suspension unit 5 assembled from said panels.

An airborne vehicle with mounted-on equipment is provided with an emergency jettisoning system for the suspension unit and an emergency recovery system for the entire airborne vehicle. The emergency recovery system consists of a stabilization system and soft landing engines. The stabilization system with its actuator device in the form of, e.g., a parachute is accommodated in the cargo compartment 26 in the central area of the suspension unit 6, and the soft landing engines are situated on the suspension pylons 24, 25 of the unit 6 (FIG. 7).

The soft landing engines appear as a convergent-divergent device (nozzle) situated at the end of a gas generator gas flow passage, the interior space of the nozzle communicating with the interior space of the gas generator through control members.

A fuel charge is placed in the gas generator chamber. The fuel-charge gas generator is also applied for emergency jettisoning of the suspension unit; this being the case, the initiation of the gas generator is accompanied by delivering an electric signal for releasing the locks of the attachment unit of suspension unit 6.

The soft landing engines are provided with a cooling jacket located in the gas flow passage upstream of the convergent-divergent device (nozzle) and having its interior space in communication with the interior space of the suspension fuel device through the front manifold and the feed system control members, while communication of the cooling jacket interior with the interior of the nozzle which is a section of the gas-flow passage of the fuel-charged gas generator, is established through the rear manifold which appears as an annular space in the nozzle critical section.

Figure 8:
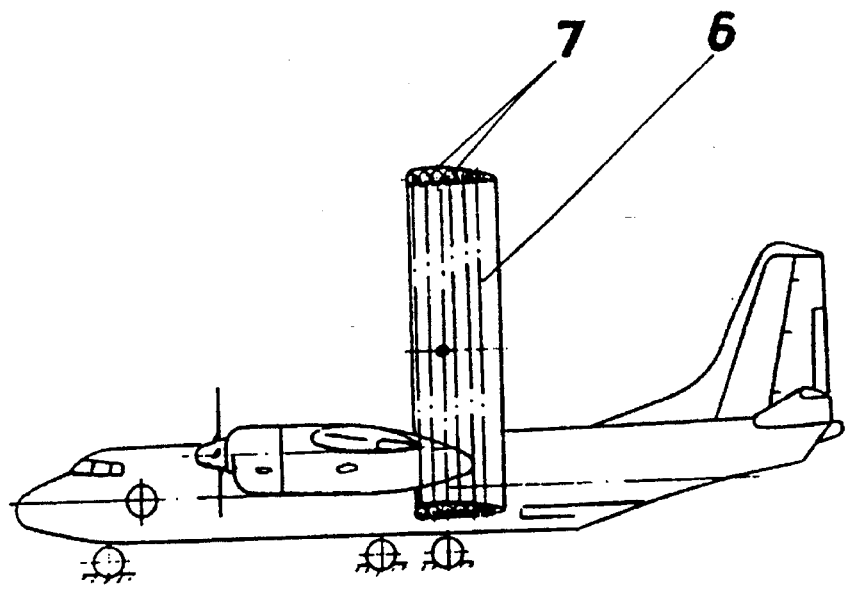
FIG. 8 is a schematic view of the airborne vehicle with a vertically arranged suspension unit relative to the fuselage center line.

The vehicle suspension unit may be vertical relative to the fuselage center line (FIG. 8).

Figure 9:
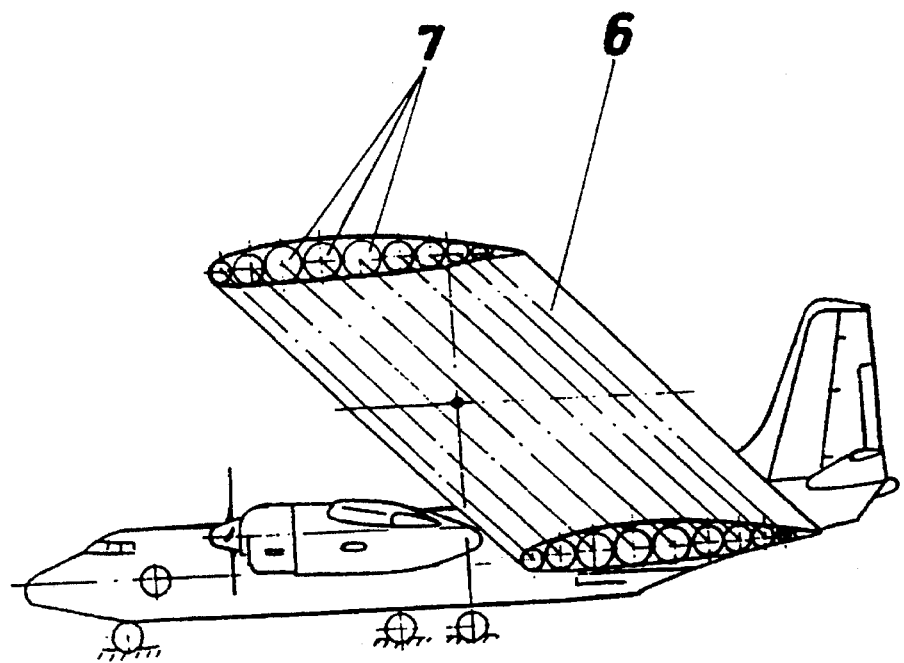
FIG. 9 is a schematic view of the airborne vehicle with the supension unit arranged in an inclined position with respect to the fuselage center line.

The vehicle suspension unit may be inclined with respect to the fuselage center line (FIG. 9).

Figure 10:
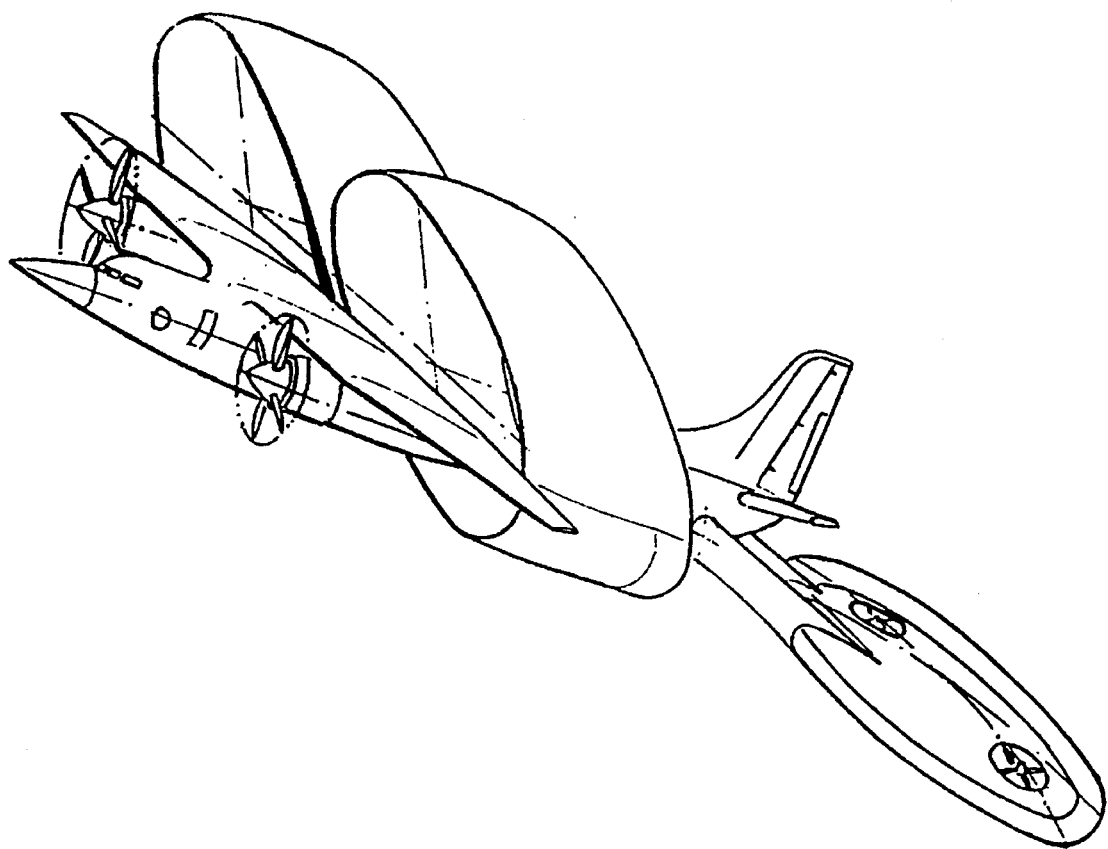
FIG. 10 is a perspective view of the airborne vehicle of FIG. 1 with a mounted unit and a suspension unit while in the GEM flight mode.

Take-off from and landing on water surface are carried out with the aid of tiltable mounted devices 6 indicated with a dotted line in FIG. 1, said devices being also used for the vehicle flight in the ground-effect machine regime (FIG. 10).

The airborne vehicle of the present invention functions as follows.

Each of the airborne vehicle components is self-contained for creation of aerodynamic lift and thrust production, with values such as to provide independent flight either in assembly with a sectionalized airborne vehicle or as a self-contained apparatus less the suspension unit 6. On the other hand, while considering said components in the aggregate as an integrated airborne vehicle featuring the broken fore-and-aft axis thereof, the mutual arrangement of said components provides not only conditions for realizing a controlled flight but also for adjusting the airstream compression ratio of the ramjet engine. Thus, one can extend the range of supersonic flight speeds towards the hypersonic ones. Furthermore, no additional aerodynamic drag forces are liable to arise at a subsonic flight speed from the "hypersonic" ramjet inlet device because of its being located in the fuselage air shadow.

The vehicle runs along the runway on the main landing gear 4 and the additional landing gear 18 by virtue of the engine-propeller unit engines 22 and the power plant 3. During a rolling take-off of the vehicle and lift-off of the nose strut wheel of the landing gear 4, a swivel occurs in the additional hinge joint 5, thus providing that the position of the center line of the fuselage I is independent of the position assumed by the suspension unit 6. When taking off suspension unit 6 assumes the various positions depending on the climb rate, by making use of the effect of the jets of the power plant 5 on the lifting surface of the suspension unit 6. In this case the ground effect influences positively the vehicle take-off. While performing a level flight at a subsonic speed the staged flight vehicle features an unbroken common fore-and-aft axis but the deflectability of the suspension unit on either side renders the vehicle flight stable and controllable. Upon reaching a supersonic speed the suspension unit 6 moves down relative to the center line of the fuselage 1, and the center line itself assumes the position of the trimming angle of attack with respect to the flight velocity vector. Such a position of the vehicle contributes also to a reduced moment on the additional hinge joint. Then the additional power plant 8 is turned on. The incoming airstream is compressed by the bottom portion of the surface of the fuselage 1 and of the wing 2 and is then admitted to pass to the inlet device 11, thus increasing the ratio of airstream compression by the side shaped faces 12 of the front opening ahead of the entrance to the flow-through section of the engine 10. The temperature of the decelerated airstream in vehicle boost phase, however, is inadequately high for an intense development of the fuel combustion chain mechanism due to too short a time of residence of a reactant particle in the flow-through section of the engine and a high concentration of molecular nitrogen therein. Therefore, the airstream preheating system is turned on, which is in fact the combination engine 19 with afterburning of the incomplete combustion products from the high-temperature gas generator, which is used as a vortex generator, e.g., the rotatable gas passages being in the form of a skewed-section supersonic Laval nozzle. The rotatable gas passages provide not only an efficient intermixing of the airstream,fuel (hydrogen), and incomplete combustion products from the high-temperature gas generator, but also generate, by virtue of impinging supersonic air jets, shock waves which produce a substantial effect on the contacts of the rates of chemical chain-mechanism reaction, thus promoting their completion in the afterburning mechanism with a high molecular nitrogen concentration.

Then the products of afterburning are discharged through the exit device 13, thus developing a thrust at high supersonic flight speeds. As the supersonic flight speed increases, power plant 3 is shut down and the vehicle continues flying at a cruising speed only on the additional power plant 8. In this case the cruising altitude, e.g., H=36 km, is increased, at which altitude the intensity of cosmic radiation is substantially lower, thereby making the requirements imposed on the vehicle construction less stringent so as to ensure health protection of the passengers and vehicle crew.

When a flying mission involves a flight over an increased distance to the airport of destination, detachable equipment is mounted on a base airborne vehicle designed for a limited flight range. The equipment includes the suspension unit 6 provided with an emergency jettisoning system and an emergency recovery system of the vehicle together with the detachable equipment, the additional struts of the landing gear 18, and the additional engines 8. The suspension unit is so installed as to make up a small angle between its longitudinal plane and the vehicle fore- and-aft axis. When the vehicle performs the take-off run, the lift of the suspension unit increases, thus relieving the struts of the landing gear 18 which support the unit. When the landing gear nose strut lifts off the runway, the load is redistributed among the main and additional landing gear struts. A changed load on the additional struts results in a change in the pressure in the hydraulic cylinder head end and the control valve operates to by-pass part of the fluid, thus restoring the normal pressure in the hydraulic cylinder head end, whereby the hydraulic cylinder rod moves in order to adjust the additional strut for height. Such an adjustment of the strut height provides for a required change in the vehicle angle of attack during take-off. While in flight, the suspension unit 6 creates an aerodynamic lift when an airstream flows therearound. Heat is supplied to the airstream being ejected in the convergent-divergent duct of the additional thrust device 28, said heat being generated due to a heat-and-mass exchange with the combustion products of the engines. As a result, favorable conditions are provided for the engines, since the engine turbines can operate in the overexpansion conditions. As the fuel of the suspension unit is being utilized during flight, the engines are changed over to the partial-thrust operation.

In case of emergency situation an electric signal is delivered for jettisoning the suspension unit with the hatches 29 of the cargo compartment 26 thereof and for parachute ejection. An airstream is directed through the thus-formed passage under the parachute canopy, with the result that forces are developed that stabilize the uncontrolled airborne vehicle during its falling. In this case a force arises, resulting from vertical airstream flows around the suspension unit and decelerating the vehicle falling speed. Near the ground surface an electric signal is sent for starting the fuel-charged gas generator and the system of fuel feed from the suspension unit 6 to the nozzle unit of the soft landing engines, wherein the products of combustion of the gas generator fuel charge gasify the fuel of the vehicle main engines, e.g., hydrogen from the suspension unit 6, thus adding to the operating efficiency of the gas jets due to a reduced molecular weight of the gas flow, an increased weight thereof and energy of fuel afterburning in the air fed from the air system. Thus, a soft landing is performed.

In case of an emergency situation requiring jettisoning of the suspension unit 6, an electric signal is delivered for releasing the locks of the suspension unit attachment unit concurrently with starting the fuel-charged gas generator and with ejection of the parachute 7.

The present invention can find application in construction of aircraft engines both for development of novel airborne vehicles and for modernizing the existing ones.

Practical application of the present invention is instrumental in extending the flight stage distance both at supersonic speeds with the specified load-carrying capacity and at subsonic speeds which will result in higher economic characteristics and performance of the airborne vehicle.

We claim:

1. An airborne vehicle, comprising a fuselage with a center line, a wing, a gas-turbine power plant situated under the wing and burning a hydrocarbon fuel, a landing gear, and flight controls, said vehicle comprising: a suspension unit that consists of shells of additional fuel reservoirs, an additional power plant, and cowlings forming an airfoil capable of developing an aerodynamic lift, said suspension unit being held to the fuselage and having a front opening and a rear opening, said front and rear openings having shaped side faces and axes of symmetry in a vertical plane passing through the fuselage center line, the additional power plant being a ramjet engine interposed between the front and rear openings of the suspension unit, said shaped side faces of the front opening forming an inlet device for the ramjet engine, said ramjet engine having an inlet section proper, said ramjet engine having a longitudinal axis and creating a velocity vector, said shaped side faces of the rear opening forming an exit device, said ramjet engine having a variable ratio of air stream compression in a flow-through section thereof from a minimum value at subsonic flight speeds when the ramjet engine inlet device and the inlet section proper of the ramjet engine is situated in an air shadow of the fuselage up to a maximum value at high supersonic flight speeds, the degree of airstream compression being varied by changing the position of the ramjet engine inlet device either through displacing the suspension unit downwards relative to the fuselage center line or by displacing the fuselage center line, using the flight controls, with respect to the velocity vector the ramjet engine exit device being deflectable from the ramjet longitudinal axis at high supersonic flight speeds, and said rear opening being closeable by panels at subsonic flight speeds, the suspension unit being additionally provided with a landing gear and motion controls.

2. An airborne vehicle according to claim 1, CHARACTERIZED in that the additional power plant is provided with an airstream preheating system in the boost phase of vehicle flight until cruising speed is attained, said preheating system being a high-temperature gas generator and a combination turbojet-ramjet engine with afterburning of products of incomplete fuel combustion from the high-temperature gas generator, said combination engine having a ramjet section, said combination engine having cases on opposite sides of the ramjet section, the ramjet section having front flaps situated ahead of rear flaps.

3. An airborne vehicle according to claim 1, CHARACTERIZED in that the suspension unit has external surfaces curvilinear in a transverse plane, and the additional power plant includes engine-propeller units for take-off, said propeller units being arranged symmetrically with respect to the ramjet longitudinal axis.

4. An airborne vehicle according to claim 1, CHARACTERIZED in that said suspension unit has a front edge and said fuselage has a fuselage disengagement unit, said vehicle including a hinge for joining said fuselage and said suspension unit and having longitudinal stands so as to enable the front edge of the suspension unit to be located past fuselage and the fuselage disengagement unit in cases of emergency.

5. An airborne vehicle according to claim 1, CHARACTERIZED in that the additional fuel reservoirs are toroidal-shaped, pliable and different in cross-sectional dimensions, said reservoirs being consecutively inserted one into another so that smaller solids of revolution having smaller outside diameters be put into respective inside diameters of greater-radius solids of revolution to form a closed curve.

6. An airborne vehicle according to claim 1, including means for holding said suspension unit to said fuselage, said holding means including the additional power plant.

7. An airborne vehicle according to claim 1, CHARACTERIZED in that said fuselage has a first surface and said suspension unit has a second surface, said first and second surfaces forming a convergent-divergent duct, said duct being a component of vehicle additional thrust and communicating with the exit device of the additional power plant.

8. An airborne vehicle according to claim 1, CHARACTERIZED in that the suspension unit has suspension unit landing gear struts, said vehicle having main landing gear wheels on said fuselage with first axes of rotation, said suspension unit landing gear wheels having second axes of rotation, the second axes of rotation of the suspension unit landing gear wheels being off the first axis of rotation of the main landing gear wheels, said struts being adjustable for length.

9. An airborne vehicle according to claim 1, CHARACTERIZED in that the suspension unit has soft landing engines.

10. An airborne vehicle according to claim 1, CHARACTERIZED in that the suspension unit is separable into component parts in a vertical plane, said components being held together by bundles from a composition material of unidirectional fibers; the suspension unit includes a cargo compartment for a parachute.

11. An airborne vehicle according to claim 1, CHARACTERIZED in that the suspension unit makes an angle with the fuselage center line.

* * * * *